United States Patent [19]

Guha

[11] Patent Number: 6,108,651
[45] Date of Patent: *Aug. 22, 2000

[54] HEURISTIC CO-IDENTIFICATION OF OBJECTS ACROSS HETEROGENEOUS INFORMATION SOURCES

[75] Inventor: Ramanathan V. Guha, Los Altos, Calif.

[73] Assignee: Netscape Communications Corporation, Mountain View, Calif.

[*] Notice: This patent is subject to a terminal disclaimer.

[21] Appl. No.: 09/243,210

[22] Filed: Feb. 2, 1999

Related U.S. Application Data

[63] Continuation of application No. 08/925,632, Sep. 9, 1997.

[51] Int. Cl.⁷ ..................................... G06F 17/30
[52] U.S. Cl. ...................... 707/4; 707/2; 707/3; 707/103; 707/104; 707/4; 707/100
[58] Field of Search ...................... 707/2–3, 4, 100–103; 704/3, 4, 103, 104

[56] References Cited

U.S. PATENT DOCUMENTS

| | | | |
|---|---|---|---|
| 4,930,071 | 5/1990 | Tou et al. | 364/300 |
| 5,317,742 | 5/1994 | Bapat | 395/680 |
| 5,544,355 | 8/1996 | Chaudhuri et al. | 707/2 |
| 5,594,898 | 1/1997 | Dalal et al. | 707/2 |
| 5,600,831 | 2/1997 | Levy et al. | 707/2 |
| 5,630,121 | 5/1997 | Braden-Harder et al. | 707/4 |
| 5,826,077 | 10/1998 | Blakeley et al. | 707/4 |
| 5,895,465 | 4/1999 | Guha | 707/4 |
| 5,943,665 | 8/1999 | Guha | 707/2 |
| 5,970,490 | 10/1999 | Morgenstern | 707/10 |

FOREIGN PATENT DOCUMENTS

| | | | |
|---|---|---|---|
| 0 336 584 A2 | 10/1989 | European Pat. Off. | 707/7 |
| 0348331 A2 | 12/1989 | European Pat. Off. | |
| 0 399 744 A2 | 11/1990 | European Pat. Off. | 707/200 |
| 0 348 331 A2 | 12/1998 | European Pat. Off. | 707/1 |

OTHER PUBLICATIONS

Gruber, Martin, "Understanding SQL", 1990 Sybex Inc., ISBN: 0–89588–644–8 pp. 87–123, Jan. 1990.

Jang Gi–Hwa, "An Extended Model for Integration between the Oracle DBMS and WWW", Proceedings of 1997 International Conference on Information, Communications and Signal Processing, 1997 ICICS., Sep. 9–12, 1997 vol. 1, ISBN 0–7803–3676–3, pp. 569–572.

Mullen, James, "Supporting queries in the O–Raid object–oriented database system", Fourteenth Annual International Computer Software and Applications Conference, 1990. Oct. 31–Nov. 2 1990, ISBN: 0–8186–2054–4, pp. 245–250.

Yan, Weipeng, "Performing group–by before join/spl lsqb/query processing/spl rsqb/", Proceedings 10th International Conference Data Engineering, 1994. ISBN: 0–8186–5402–3, Feb. 14–18, 1994, pp. 89–100.

*Primary Examiner*—Hosain T. Alam
*Assistant Examiner*—Shahid Alam
*Attorney, Agent, or Firm*—Michael A. Glenn; Kirk Wong

[57] ABSTRACT

A method and system for generating a database query language request for performing a join between a plurality of database tables including a first database table and a second database table. The first table includes a first plurality of fields and the second database table includes a second plurality of fields, where each one of the plurality of fields has a particular meaning. The method and system includes providing a plurality of expressions that communicate the meaning of the each of the fields in the first and second plurality of fields. A user then submits a query requesting information from the tables in the form of a conjunction of literals. Each of the literals are then mapped to all matching expressions to provide a list of fields to be queried. The list of fields includes a first field from the first table and a second field from the second table, such that the mapping indicates that the first and second fields have the same meaning. After mapping the literals to the expressions, the database query language request is generated using the list of fields, such that the database query language request includes a join between the first and second fields. The first and second tables are then queried using the database query language request to provide the requested information.

14 Claims, 9 Drawing Sheets

| S | S# | SNAME | STATUS | CITY |
|---|----|-------|--------|------|
|   | S1 | Smith | 20 | London |
|   | S2 | Jones | 10 | Paris |
|   | S3 | Blake | 30 | Paris |
|   | S4 | Clark | 20 | Athens |

| P | P# | PNAME | COLOR | WEIGHT | CITY |
|---|----|-------|-------|--------|------|
|   | P1 | Nut   | Red   | 12 | London |
|   | P2 | Bolt  | Green | 17 | Paris |
|   | P3 | Screw | Blue  | 17 | Rome |
|   | P4 | Screw | Red   | 14 | London |
|   | P5 | Cam   | Blue  | 12 | Paris |
|   | P6 | Cog   | Red   | 19 | London |

*FIG. 2*

```
SELECT   S#, STATUS
FROM     S
WHERE    CITY = 'PARIS';

Result:  S#   STATUS
         S2   10
         S3   30
```

*FIG. 3A*

```
SELECT   S.S#, S.STATUS
FROM     S
WHERE    S.CITY = 'PARIS';
```

*FIG. 3B*

```
SELECT    S#, SNAME, STATUS, S.CITY,
          P#, PNAME, COLOR, WEIGHT          /* or P.CITY*/,
FROM      S, P
WHERE     S.CITY = P.CITY;
```

| S# | SNAME | STATUS | S.CITY | P# | PNAME | COLOR | WEIGHT |
|----|-------|--------|--------|----|-------|-------|--------|
| S10 | Smith | 20 | London | P1 | Nut | Red | 12 |
| S1 | Smith | 20 | London | P4 | Screw | Red | 14 |
| S1 | Smith | 20 | London | P6 | Cog | Red | 19 |
| S2 | Jones | 10 | Paris | P2 | Bolt | Green | 17 |
| S2 | Jones | 10 | Paris | P5 | Cam | Blue | 2 |
| S3 | Blake | 30 | Paris | P2 | Bolt | Green | 17 |
| S3 | Blake | 30 | Paris | P5 | Cam | Blue | 12 |
| S4 | Clark | 20 | London | P1 | Nut | Red | 12 |
| S4 | Clark | 20 | London | P4 | Screw | Red | 14 |
| S4 | Clark | 20 | London | P6 | Cog | Red | 19 |

*FIG. 4*

PERSON (FIRST_NAME LAST_NAME PHONE_NUMBER) (DATE_OF_BIRTH ADDRESS LAST_NAME) (UNIQUE_STRING ID) (SSN)

(SSN [CL.PERSON] CL.SSN)
(UNIQUE_ID_STRING [CL.PERSON] CL.CID)
(DATE_OF_BIRTH [CL PERSON] CL.BIRTH_DATE
(ADDRESS [XP.PERSON] XP.ADD)
(UNIQUE_ID_STRING [XP.PERSON] XP.ADD)
(FIRST_NAME [XP.PERSON] XP.FIRST_NAME)
(DATE_OF_BIRTH [XP PERSON] XP.DOB)

((SSN $x y$) AND (ADDRESS $x $z) AND (FIRST_NAME $x "Fred"))

*FIG. 12*

$x    [CL.PERSON]
$y    CL.SSN
$x    [XP.PERSON]
$z    XP.ADD
"Fred" XP.FIRST_NAME

*FIG. 13*

SELECT    CL.SSN XP.ADD
FROM      CL XP
WHERE     [CL.PERSON] = [XP.PERSON] AND
               XP.FIRST_NAME = "Fred"

*FIG. 14*

SELECT    CL.SSN XP.ADD
FROM      CL XP
WHERE     CL.CID = XP.CUST_ID AND
               XP.FIRST_NAME = "Fred"

*FIG. 15* ated to heuristically co-identifying objects across heterogeneous information sources, and more particularly to a method and system for automatically generating joins across tables in a heterogeneous collection of databases.

HEURISTIC CO-IDENTIFICATION OF OBJECTS ACROSS HETEROGENEOUS INFORMATION SOURCES

CROSS-REFERENCE TO RELATED APPLICATIONS

This application is a continuation application of U.S. Ser. No. 08/925,632 filed Sep. 9, 1997.

FIELD OF THE INVENTION

The present invention relates to heuristically co-identifying objects across heterogenous information sources, and more particularly to a method and system for automatically generating joins across tables in a heterogeneous collection of databases.

BACKGROUND OF THE INVENTION

A database system may be described as a computerized record keeping system whose overall purpose is to maintain information and to make that information available on demand. Many databases in use today are based on a "relational model" in which the database data is perceived by its users as a collection of tables. The tables in a relational database include a row of column names specifying one or more column fields, and zero or more data rows containing one value for each of the column fields. Therefore, the value contained in each field in a column represents a specific instance of that concept. For example, a table pertaining to parts in a manufacturing database may contain a column of part numbers, and each field in that column may contain a part number value that identifies a specific part or object.

One feature that distinguishes relational from nonrelational databases is the ability to "join" two or more tables. In general, a join is described as a query in which data is retrieved from the fields of more than one table (although data may also be retrieved by joining a table with itself). In order to join two or more tables, the tables need to share at least one column. Typically, the purpose of the join is to connect data about the same object across the tables being joined. In such cases, for the results of the join to be meaningful, the columns that represent the same real-world concepts in the different tables must use the same field values to represent the same instances of those object. For example, assume two columns contain values pertaining to the concept of states. If a field value that represents the state of Ohio in one table is the string "OH", then the field value for the state of Ohio in the other column must also be the string "OH" in order to effect a successful join between the tables.

Typically, the tables within the same database are joined. However, with current database technology, the tables to be joined need not be physically present in the same database. Products such as SQL Connect from Oracle and SQLNet from Microsoft, enable the use of a heterogeneous database where a collection of database tables on different hardware platforms operating under different database management systems all appear to a user to be on one machine operating under one database management system.

To illustrate the use of a heterogeneous database, consider the following situation. A user, who could be a reporter, researcher or marketer, would like to quantitatively judge the effect of personal computers on college education. She would like to find out the correlation between the average GRE scores and average GPAs vs. the per capita consumption of computers by the students at a number of universities.

Assume that all the information that is required to answer this question is available on-line from the different databases that are maintained by different entities. An Examination Testing Service maintains a database including GRE scores, a marketing research firm maintains a database including the number of computers sold to students, and registrar offices at the universities maintain databases that include GPAs.

Despite this, getting the answer could take weeks if not more due to the following process. Generally speaking, an end user does not have the expertise to perform the query. Therefore, the user typically communicates the query to a management information specialist (MIS) who is responsible for such tasks. The MIS person then contacts the administrators of the relevant databases to solicit the database schemes (information regarding the tables, such as the name of the column fields, the data types and formats, etc.). After obtaining the schema's of the databases, the MIS person writes the user's query in a standard query language (SQL), which joins the relevant tables from the different databases. In response to submitting the query to the databases, the requested information is retrieved and the MIS person communicates the answer to the user.

This process is not only very slow, it is also very expensive because of the large amount of inter-human communication involved. Most of the effort is exerted by the MIS person when determining which databases might be relevant and then eliciting the schema information from the administrators of each of the databases. To summarize the process, the end user must inform the MIS person what information is requested, and then the MIS person must determine where it is, and how to obtain it by soliciting the database administrators. In a sense, the set of database administrators act as a "librarian" who knows what resides on which database and in which tables. Unfortunately, no one librarian can keep track of more than a very small fraction of all the tables available, and queries capable of joining the tables must be handwritten by the MIS person.

Part of what makes this process slow and expensive is that often, the tables that must be joined in order to answer the query were not designed to be joined in the first place. The purpose of the join is to co-identify objects across tables.

Accordingly, what is needed is an automated method and system for co-identifying objects across heterogenous information sources without user intervention. The present invention addresses such a need.

SUMMARY OF THE INVENTION

The present invention provides a method and system for generating a database query language request for performing a join between a plurality of database tables including a first database table and a second database table. The first table includes a first plurality of fields and the second database table includes a second plurality of fields, where each one of the plurality of fields has a particular meaning. The method and system includes providing a plurality of expressions that communicate the meaning of the each of the fields in the first and second plurality of fields. A user then submits a query requesting information from the tables in the form of a conjunction of literals. Each of the literals are then mapped to all matching expressions to provide a list of fields to be queried. The list of fields includes a first field from the first table and a second field from the second table, such that the mapping indicates that the first and second fields have the same meaning. After mapping the literals to the expressions, the database query language request is generated using the list of fields, such that the database query language request includes a join between the first and second fields. The first and second tables may then queried using the database query language request to provide the requested information. According to the system and method disclosed herein, a user is able to access heterogeneous information sources without knowledge of the information source's schemes and without the need for a information specialist.

BRIEF DESCRIPTION OF THE DRAWINGS

FIG. 2 is a diagram illustrating database tables in an example database.

FIGS. 3A and 3B are diagrams illustrate an example Standard Query Language (SQL) SELECT statements.

FIG. 4 illustrates a SQL query that includes a join operation, and the results returned by executing the query.

FIG. 12 is a diagram illustrating an example query that has been translated into MCF literals.

FIG. 13 is a diagram illustrating an example of literals from a MCF query that have been mapped to the literals in the example knowledge base.

FIG. 14 is a diagram illustrating a pseudo SQL query that is generated when the heuristics of the present invention are applied to an example query.

FIG. 15 is a block diagram illustrating a SQL query generated from the pseudo SQL once the implicit fields are replaced by explicit fields.

DESCRIPTION OF THE INVENTION

The present invention relates to an improvement in co-identifying objects across disparate information sources. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a method and system for heuristically co-identifying objects across heterogenous information sources. As used herein, the term "information source" is any collection of data, such as a database or file of information such as a file of addresses and a file of e-mail addresses, for example. For purposes of illustration, however, an information source will be described primarily herein as a database.

The present invention will be described as being used and implemented with a standard query language (SQL), as described in "An Introduction to Database Systems" by C. J. Date (Addison-Wesley Publishing Company, 5th ed., 1990), which is herein incorporated by reference. However, it should be understood that the present invention may be used and implemented with any type of database language.

Figure 1:
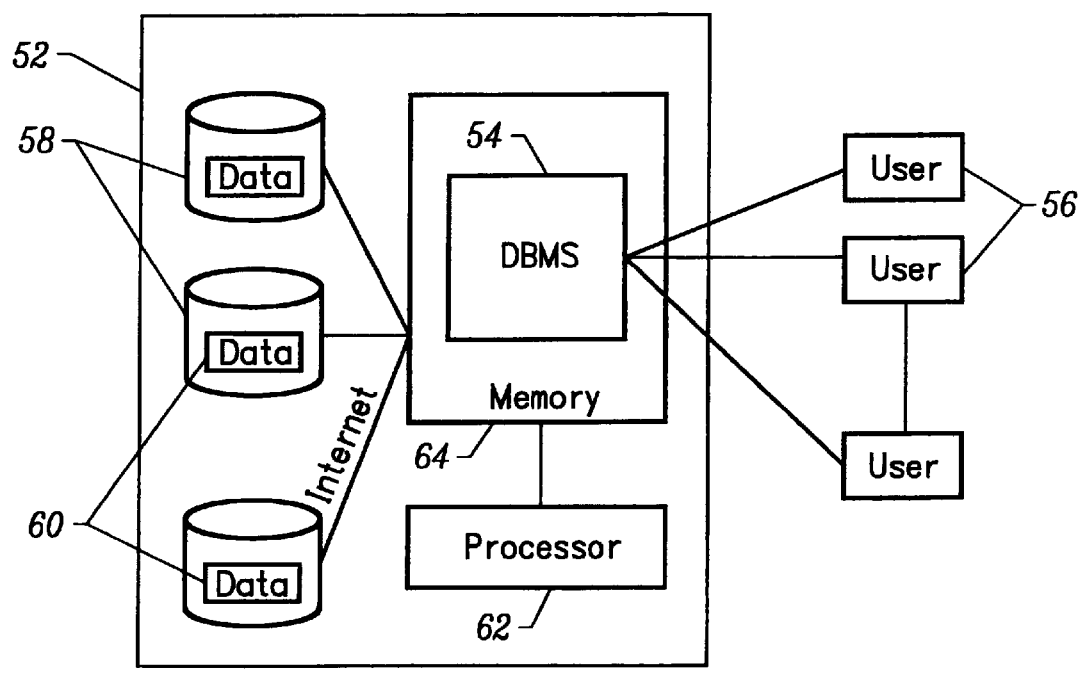
FIG. 1 is a block diagram of a relational database system environment in which the present invention operates.

FIG. 1 is a block diagram of a relational database system environment in which the present invention operates. The database system 50 includes database hardware 52, database software 54, and users of the database 56. The database hardware 52 includes storage devices, typically hard disk drives 58, for storing database data 60, together with associated input/output devices, such as device controllers (not shown). A processor 62 and associated main memory 64 are used to support the execution of the database system software 54.

The database data 60 may be located in a central location and/or located remotely via a network, such as the Internet, for example. The database 50 is based on the relational model in which the data 50 is organized as a collection of tables. For purposes of explanation, assume that the database 50 is maintained by a manufacturing company to record information about its manufacturing projects, the parts used in those projects, and the suppliers who supply those parts. The projects, parts, suppliers, etc., thus constitute the basic entities or objects about which the company needs to record information.

FIG. 2 is a diagram illustrating two tables included in the example manufacturing-supply database. The manufacturing-supply database includes a supplier table (S) where each row represents a different supplier, a parts table (P) where each row represents a different part. Each column in the tables stores data regarding a particular concept or object. The S table includes columns representing a unique supplier number (S#), a supplier name (SNAME), a rating or status (STATUS); and a location (CITY). The P table includes columns representing a unique part number (P#), a part name (PNAME), a color (COLOR), a weight, and a location where parts of that type are stored (CITY). Therefore, the values contained in each field in a column represent a specific instance of these concepts. For example, the column (P#) in the parts table (P) represents the concept of part numbers, and each field in that column contains a value representing one specific part number.

Referring again to FIG. 1, the database system software 54, hereinafter referred to as the database management system (DBMS), is the interface between the users 56 of the system and the physical database itself (i.e., the data 60 and the disk drives 58). The users 56 of the database 50 may be categorized in three broad classes: application programmers who are responsible for writing application programs that use the database 50, end-users who interact with the database 50 from on-line terminals, and database administrators (DBAs) who create and maintain the database 50 and who provide multiple end-users with security access to the database 50. If the database 50 is designed for a single user, as opposed to multi-user database, then the end-user also performs the function of the DBA.

All request from users for access to the database data 60 are handled by the DBMS 54. The DBMS 54 thus shields the users 56 from hardware-level details of the database 50 by supporting database operations, such as adding files to the database, inserting data into existing files, updating files, deleting files, and retrieving data from existing files.

The DBMS 54 includes a built-in application, typically referred to as a query language processor, by which a user 56 is able to issue high-level commands or statements to the DBMS 54. Such commands include SELECT, INSERT, UPDATE and DELETE, which are examples of statements from the standard database language known as SQL (Structured Query Language). The SQL commands and queries are typically entered into the DBMS 54 through either a command-driven interface or through a menu-driven interface in which the user 56 is not required to enter commands, but instead fills in items on a form and chooses items from menus. As an example of a user query, assume that a user has the following request: "Find supplier numbers and status for suppliers in Paris." The request may be expressed as a SQL SELECT statement, as illustrated in the following figures.

FIGS. 3A and 3B illustrate an example SQL query using the supplier-parts database. As shown in FIG. 3A, the SELECT command specifies the desired fields FROM a specified table WHERE some specified condition is true. When querying information from more than one table, a query must be formulated using qualified field names that comprise both the table name and the field name, separated by commas. FIG. 3B illustrates the query shown in FIG. 3A rewritten with qualified field names.

A query in which data must be retrieved from more than one table usually requires a "join" operation. For example, assume a user of the supplier-parts database has the following request: "Find all combinations of supplier and part information where both the supplier and the part are located in the same city." From the request, it can be seen that the required data must be obtained from two tables, S and P.

FIG. 4 illustrates the request above expressed as a SQL statement and the results returned by executing the query. In the SQL statement, both the S and P tables are named in the FROM clause. The connection between the two tables, that S.CITY=P.CITY, is called is the join condition and is expressed in the WHERE clause. As shown, the result of the query is a join of tables S and P over matching fields, in this case, CITY values. In this example, the join is used to co-identify particular cities from two different information sources, the S and P tables.

In the supplier-parts example, the join condition is easily met because the field values contained in the CITY columns used to represent the same instances of the concept of cities (e.g. the city London). However, in some database environments, it is possible that column fields representing the same concepts (e.g. cities or parts) in two different tables may not use the same field values to represent the same instances of those concepts. Even worse, the two tables may not share any common fields in which to join. This occurs most often in heterogeneous databases, where separated databases are maintained by separate entities.

Figure 5:
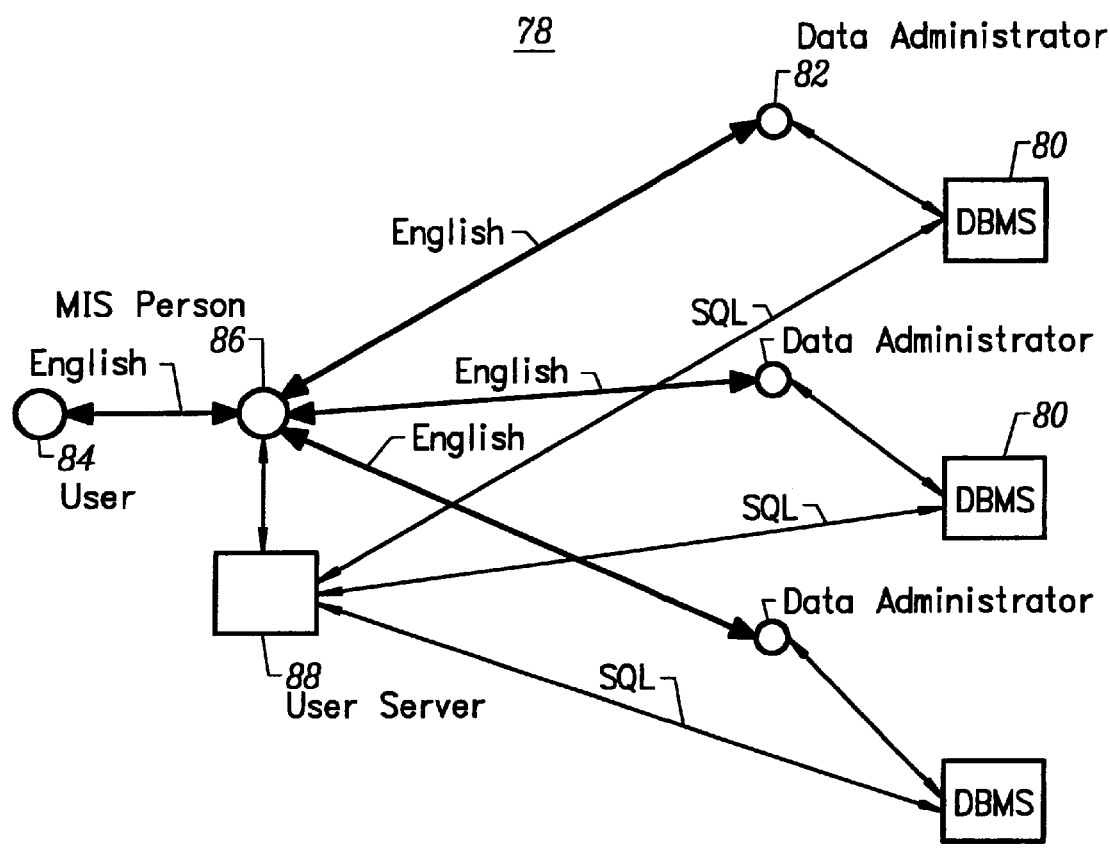
FIG. 5 is a block diagram illustrating a conventional heterogeneous database environment.

FIG. 5 is a block diagram illustrating a conventional heterogeneous database environment. Access to the information in the heterogeneous database 78 by a user 84 is a multi-step process. Typically, the user 84 communicates a request for information in English or other type of human language to a MIS person 86 who is responsible for computer related issues for a particular entity. The MIS person 86 sends an English request for information regarding the schemes of each database 80 to each of the data administrators 82. In return, the data administrators 82 provide the MIS person 86 with the database schema's, which include the names of the database tables, the names of the table column, the data types supported, an so on.

After obtaining the database schemes, the MIS person 86 writes the user's query in a standard query language, such as SQL that joins the relevant tables from the different databases 80. In response to submitting the SQL query to the databases 80, the requested information is sent back to the server 88, and the MIS person 86 communicates the answer to the user 84. One drawback to this approach is that obtaining the correct answer is dependent upon all of the relevant tables being queried, and on the MIS person 86 determining which tables to join when some of the relevant tables do not share any common fields. Because of the large amount of inter-human communication involved, and the labor required by the MIS person 86, accessing the heterogeneous database 78 can be very expensive and slow (e.g., it may take days or weeks before the user 84 is provided with the answer to her request).

As another example, consider a situation where a user has two or more disparate information sources, such as an address book and a list of e-mail addresses, stored on a personal computer. Both lists make references to many people, but the lists are completely distinct. Currently, there is no way for the user to co-identify the same object represented in the two heterogeneous sources, e.g. the same person. For example, it would be useful to the user to have an automatic method for determining a specific person's e-mail address from the e-mail list given the person's name, address, or telephone number selected from the address book, and vice versa.

The present invention provides a method and system for heuristically co-identifying objects across heterogenous information sources, such as different databases. As used herein, the word identify means identifying a specific object given one or more attributes. The word co-identify, in contrast, means identifying that two objects from different sources are the same object given one or more attributes describing each object. When the information sources include a heterogeneous database, the present invention allows a user to initiate queries without the use of a MIS person and without knowledge of the database schemes by automatically generating joins across the tables in the database.

Figure 6:
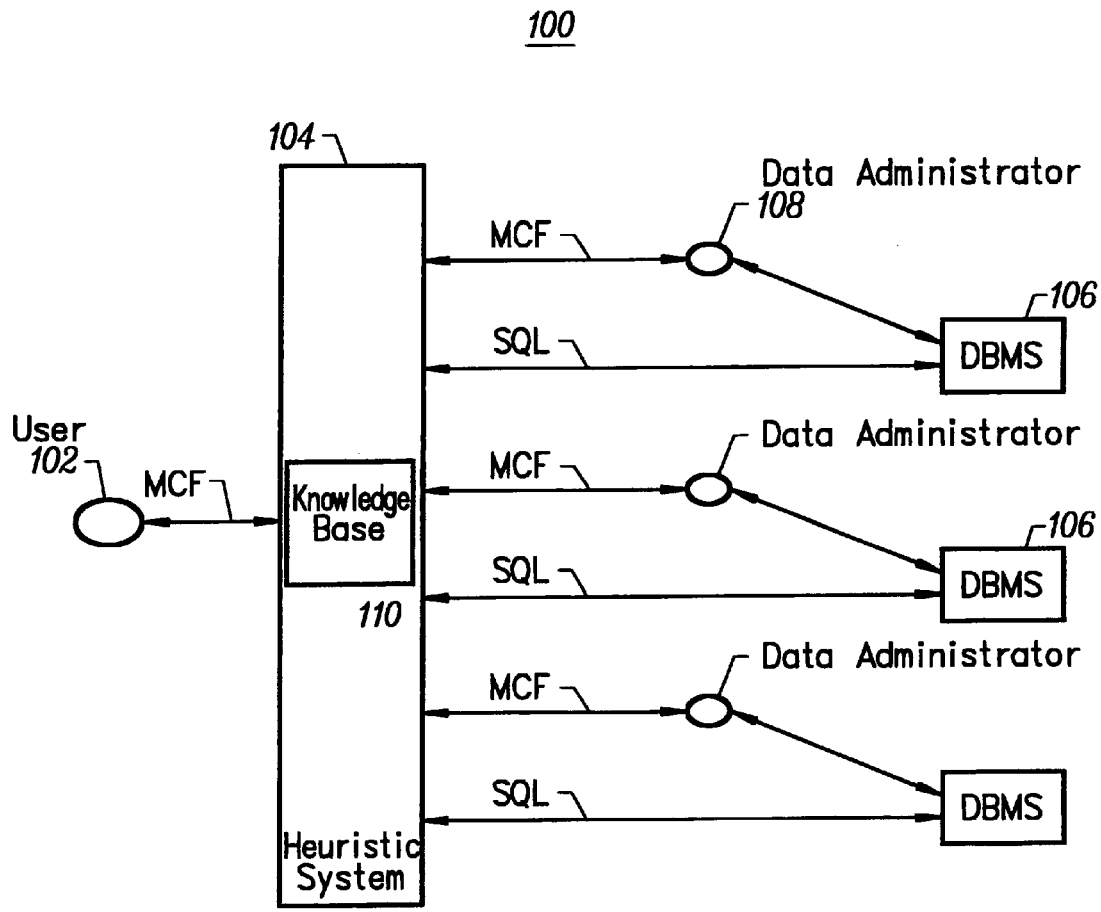
FIG. 6 is an operational block diagram illustrating a heterogeneous database system in accordance with the present invention.

FIG. 6 is an operational block diagram illustrating a heterogeneous database system in accordance with the present invention. As in a conventional heterogeneous database, the heterogeneous database system 100 comprises several heterogeneous databases 106 that are each managed by its own data administrator 108. Each of the databases 106 includes a set of tables that have heterogeneous schemes and which have been independently developed and evolved by its data administrator 108. In the heterogeneous database system 100 of the present invention, however, an end user 102 submits a request for data to a heuristic (software) system 104, rather than to a MIS person. In response to the request, the heuristic system 104 automatically identifies which tables in which databases 106 to join, and writes the SQL necessary to perform the joins. The SQL is then sent to the DBMS of each database 106, or to a central DBMS controlling the heterogeneous database 106, for execution.

The heuristic system 104 automatically identifies which tables in the heterogeneous database 106 to join by incorporating information regarding each database in the heterogeneous database 106 in a knowledge base 110. In a preferred embodiment of the present invention, the information in the knowledge base 110 is implemented in an abstract data format, referred to herein as a metae content format (MCF).

The MCF information in the knowledge base 110 may be obtained from two sources, the developers of the heuristic system 104 and from the data administrators 108. As shown by the direction arrows in FIG. 6, the information in the knowledge base 110 is not provided in terms of database schemes, however, but rather in MCF expressions that communicate the meanings and concepts represented by each of the column fields in the heterogeneous database 106, as well as the relationships between those concepts. The MCF is a logic based language for identifying relationships and attributes about concepts and objects. As explained further below, the MCF specifies not just syntax, but also the vocabulary used to describe the relationships and attributes. When a user's request is received, the heuristic system 104 attracts the concepts in the request and maps the concepts to the MCF concepts and relationships contained in the knowledge base 110. The heuristic system 104 then generates SQL that will join the tables based on whether the tables share fields representing the same concept. After composing the SQL, the heuristic system 104 submits the SQL to the heterogeneous database 106, receives the results, and passes the answers back to the user 102.

Figure 7:
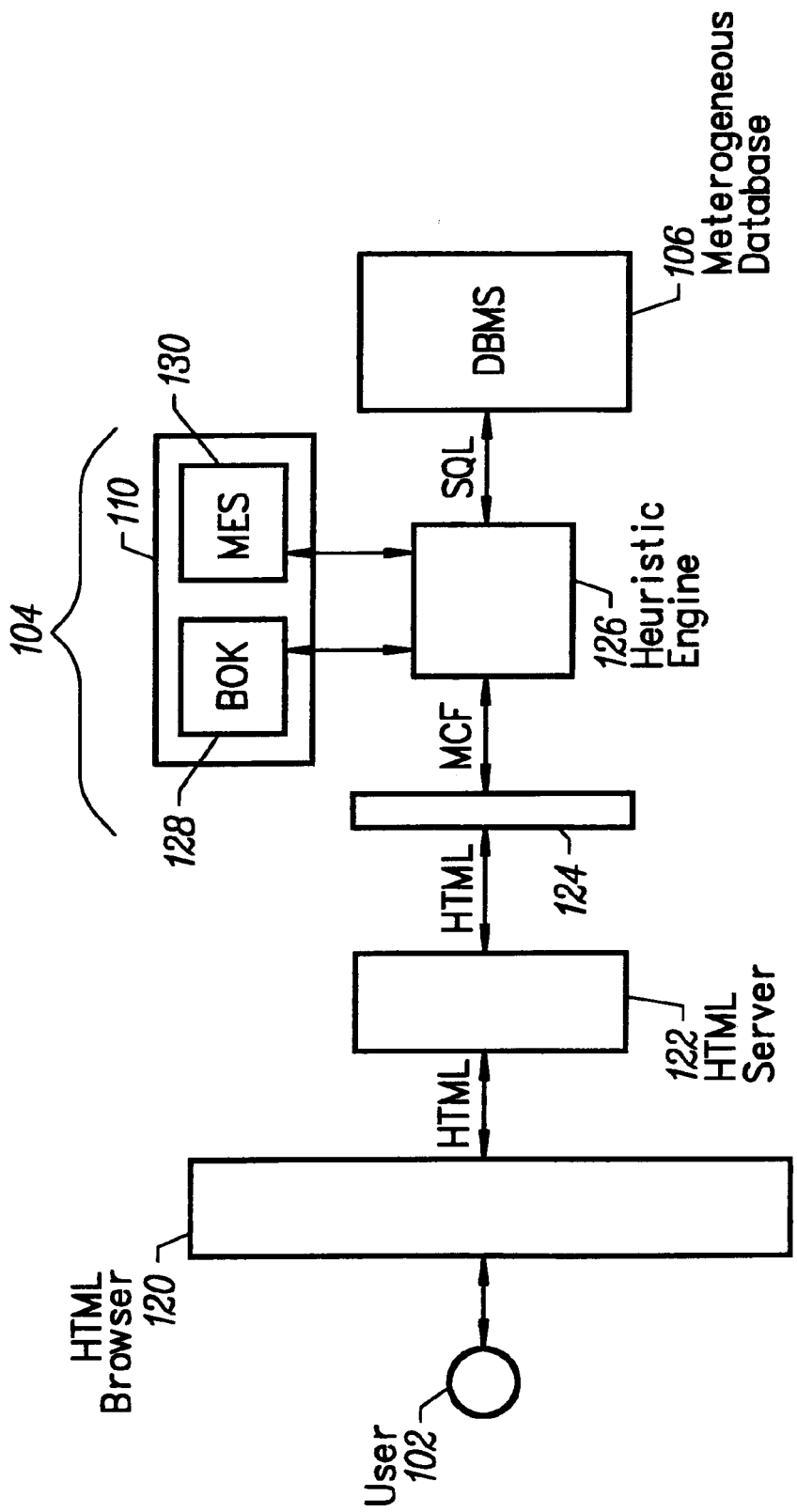
FIG. 7 is a block diagram illustrating a heuristic system implemented in a network environment in accordance with the present invention.

FIG. 7 is a block diagram illustrating the heuristic system of the present invention implemented in a hyper-text markup language (HTML) network environment. The user 102 communicates with the heuristic system 104 through a HTML browser 120 and a HTML server 122. The heuristic system 140 includes a translator 124, and a heuristic engine 126. In a preferred embodiment, the user 102 is provided a graphical user interface through the HTML browser 120 in which to enter queries to the heuristic system 104. The queries are then formatted and passed over the network to the translator 124 where the queries are translated into MCF syntax before being processed by the heuristic engine 126. In another preferred embodiment, the user 102 could be another program that the heuristic system 104 communicates with through network ports.

According to the present invention, the knowledge base 110 comprises background domain knowledge (BDK) 128 and meaning expressions (MES) 130. The BDK 128 includes MCF expressions defining relationships between terms in the database that are applicable across all tables, while the MES 130 includes MCF expressions defining relationships between terms in the database that are table specific.

Figures 8, 9, 10:
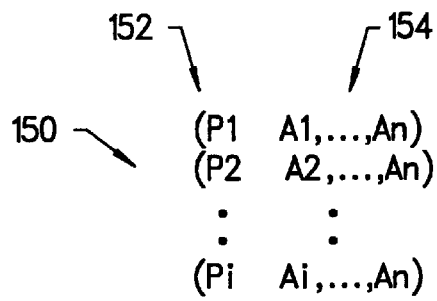
FIG. 8 is a diagram illustrating the general format of the meaning expressions in the knowledge base.
FIG. 9 is a diagram illustrating an example literal contained in the background domain knowledge.
FIG. 10 is a diagram illustrating mete content format (MCF) literals that are contained in an example knowledge base.

FIG. 8 is a diagram illustrating the general format of the meaning expression in the BDK 128 and the MES 130. In a preferred embodiment, both the BDK 128 and the MES 130 include a list of the MCF expressions called literals 150. Each literal includes a predicate (P) 152 followed by one or more arguments (A) 154. The predicate 152 in each literal 150 is a word representing a particular conceptual meaning.

In the BDK 128, the arguments 154 following each predicate 152 comprise a list of one or more attributes, the values of which uniquely identify a specific instance of the concept represented by the predicate. This is explained further with reference to FIG. 9.

FIG. 9 is a diagram illustrating an example literal 150 from the BDK 128. The literal 150 includes the predicate "Person", which represents the conceptual meaning of person. The predicate "Person" in the example literal 150 corresponds to a concept that is only implicitly referenced in database tables, rather than explicitly referenced. For example, database tables typically reference or identify specific objects, such as "people" using a variety of columns that represent concepts attributable to people, such as serial numbers, birth dates, addresses, names, insurance policy numbers, bank accounts, and so on. Tables do not, however, include a specific column devoted to the concept of "people" or a "person". Therefore, the predicate "people" and the attribute lists following the predicate define the relationship between the concept of people and the attributes (columns) that represent that concept.

Using the combination of the attributes in an attribute list, a specific instance of the concept represented by the predicate 152 may be identified from the database tables. In FIG. 9 for example, the predicate "Person" is followed by several attribute lists, which include one or more attributes attributable to "people". Each attribute list can be used to identify a specific person. For instance, the first attribute list includes the attributes "FIRST_NAME", "LAST_NAME" and "PHONE_NUMBER". This list is a heuristic indicating that a specific person may be identified by these three attributes in combination. The second attribute list is a heuristic indicating that a specific person may be identified by a combination of the attributes "DATE_OF_BIRTH", "ADDRESS" and "LAST_NAME". The next attribute list contains a single attribute "UNIQUE_STRING_ID". This attribute list is a heuristic indicating that a specific person may be uniquely identified by some unique predefined value, such as a customer ID, for example. Similarly, the last attribute list indicates a person may be identified by the single value of a social security number (SSN).

In general, if two entities or objects share the same table values for a list of attributes corresponding to the predicate in the BDK 128, then it is assumed the two entities are identical (e.g. two people are the same person if their social securities numbers match or if their address, date of birth and first name match). This provides a way to co-identify two objects given a set of attributes that describe the two objects. Since the BDK 128 contains information regarding concepts that are applicable across all tables, the BDK 128 is supplied as part of the heuristic system 104 in a preferred embodiment of the present invention.

Referring again to FIG. 8, the format of the MES 130 is similar to the BDK 128 except the arguments 154 following a predicate 152 comprise explicit table fields and implicit fields. Explicit table fields correspond to actual columns in a table, which explicitly represent a concept (e.g., part numbers). Implicit fields represent concepts that are only implicitly referenced in database tables (e.g., person).

The literals 150 comprising the MES 130 may have a variety of formats. However, for purposes of explanation, consider a literal 150 comprising a predicate 152, followed by an implicit field, followed by an explicit field. In such a literal 150, the implicit field represents an implicitly referenced concept, the predicate 152 represents an attribute that may be used to identify a specific instance of the concept represented by the implicit field, and the explicit field identifies the table and column containing the actual values for the predicate 152.

As an example of literal expressions in the MES 130 consider the following example. A bank maintains a database regarding customer information, such as names, social security numbers, customer IDs, etc. Assume that two of the tables are named CL and XP, respectively. The CL table includes: a column named SOC_SEC containing social security numbers, a column named ID containing customer identification numbers, and a column named BIRTH DATES containing customer birth dates.

The XP table includes: a column named CUST_ID containing customer identification numbers, a column named FIRST_NAME containing the first name of the customers, a column named DOB containing customer birth dates, and a column named ADD containing customer addresses.

FIG. 10 is a diagram illustrating MCF literals contained in the example MES 130 that were supplied by the bank's database administrator. In a preferred embodiment, implicit fields are enclosed with brackets, and explicit fields are written as qualified field names, which include the table name.

The first literal begins with the predicate "SSN", which is followed by two arguments, an implicit field [CL.PERSON] and an explicit field CL.SSN. The predicate "SSN", which is a MCF term for the attribute of "social security number", defines the relationship between the fields of the CL table and the concept of a "person". The literal expresses the fact that a person's social security number is one attribute that may be used to identify a specific person, and that values for social security numbers are stored in the field CL.SSN.

Because the MCF meaning expressions in the MES 130 are specific to each table in a respective database 106, the information for a particular database is provided by the corresponding database administrator 108. This means that the different database administrators 108 do not have to communicate with each other or be aware of any of the other tables that might exist in order to provide the heuristic system 104 with conceptual meaning expressions for the MES 130.

Figure 11:
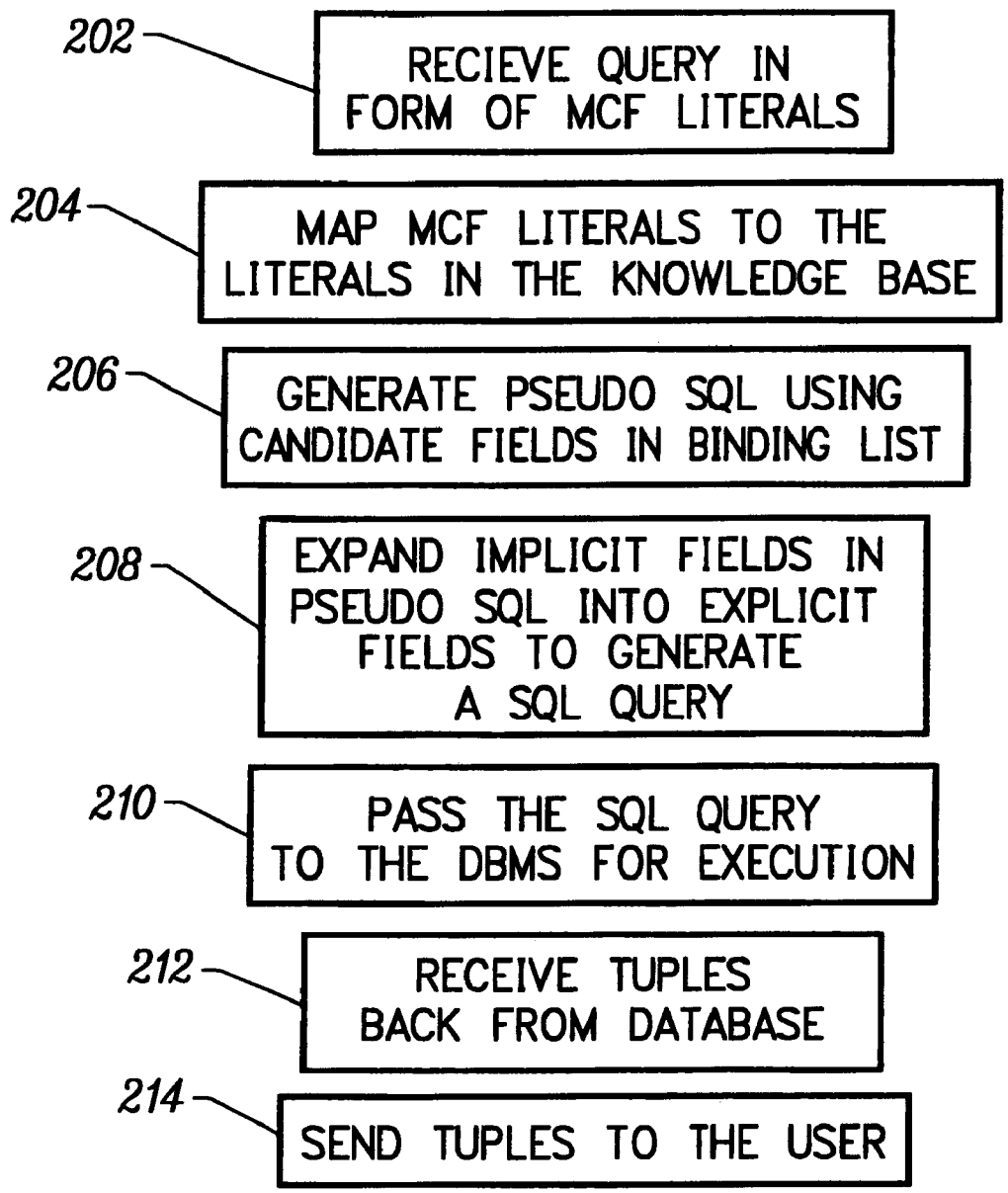
FIG. 11 is a flow chart illustrating the process of automatically performing joins across tables in a heterogeneous database in accordance with the present invention.

Using the literal expressions in the BDK 128 and the MES 130, the heuristic engine 126 can determine which tables to join to satisfy a users query, as shown with reference to FIG. 11.

FIG. 11 is a flow chart illustrating the process of automatically generating a SQL statement for performing joins across tables in a heterogeneous database in accordance with the present invention. Referring to FIGS. 7–10, the process begins when the heuristic system 104 receives a query from a user 102 in step 202. If the heuristic system is implemented in a network environment as shown in FIG. 7, then the translator 124 translates the query into a MCF query comprising a set of conjunctions of MCF literals. In a preferred embodiment, however, the query is received by the heuristic system 104 already in MCF literal format.

Each MCF literal in the query is formatted as follows:

P(V1, . . . , Van)

where "P" is a predicate which is followed by one or more variables "V". A series of conjunctions of literals appears as:

(P1 V1, . . . , Van) AND (P2 V2, . . . , Van) AND . . .
    (Pi Vi, . . . , Van)

MCF literals will be explained further by way of the following example. Assume that a user want to make a list of social security numbers and corresponding addresses for all bank customers having a first name of "Fred". Assume also that the answers to the request will be retrieved only from the bank tables CL and XP described above. The heuristic engine 126 converts the query into a set of MCF literals, as shown in FIG. 12.

FIG. 12 is a diagram illustrating an example query in MCF literal format. As a matter of convention, all variables in an MCF query begin with the symbol "$". The words preceding the variables in each literal are predicates, each of which are predefined terms in the MCF having specific well-defined meanings. In this example, the symbol "$x" in each literal is a variable for person, "$y" is a variable for social security numbers, and "$z" is a variable for addresses. In the last literal, the variable for person is followed by the constant "Fred". The last literal can be read as "find all people who's first name is Fred".

In a preferred embodiment, there is no constraint that each MCF literal requires a variable. In such a case, the query is whether a string is true, e.g. "Is true this person is named 'Fred'!", rather than requesting the system to return a list of items that met the query. Also in a preferred embodiment, neither the user 102 nor the data administrators 108 are required to work with raw MCF. Instead, the system 104 preferably includes graphical interfaces that automatically generates English.

Referring again to FIG. 11, after receiving the query, the heuristic engine 126 maps each literal found in the MCF query to the literals in the knowledge base 110 (both BDK 128 and MES 130) in step 204. Mapping the literals from the query to literals in the knowledge base provides a list of candidate table fields from which to retrieve field values (test) for each variable and constant in the MCF query. The mapping is accomplished by comparing the predicate in each literal in the MCF query to the predicates of each literal in the knowledge base 110, and then generating a list of literals, having matching predicates.

The result of the mapping is a binding list of variables and constants from the MCF query that map to fields in the database. Each entry in the binding list identifies what column field may be used to retrieve the values for the corresponding variables.

FIG. 13 is a diagram illustrating a binding list resulting from mapping each literal in the MCF query of FIG. 12 to the literals contained in the knowledge base of FIG. 10. The binding list shows that values for the person variable "$x" can be obtained from the implicit fields [CL.PERSON] and [XP.PERSON]; values for the social security number variable "$y" may be obtained from the explicit field CL.SSN; values for the address variable "$z" may be obtained from the explicit field XP.ADD; and the constant "Fred" may be matched against values in the explicit field XP.FIRST_NAME.

Referring again to FIG. 11, after mapping the literals from the query to the literals in the knowledge base 110, the heuristic engine 126 generates a pseudo SQL query using the candidate fields found in the binding list in step 206. According to the present invention, each entry in the binding list is used as a constraint that must be satisfied in the SQL query. Therefore, the tables and fields in the binding list are used to form SQL, SELECT, FROM, and WHERE clauses.

The variables will occur in the binding list according to three possibilities: 1) the variable maps to more than one candidate field, which means the variable occurs in the list more than once; 2) the variable maps to only one candidate field, so the variable occurs in the list once; and 3) the variable is a constant (e.g. "Fred").

According to the present invention, the heuristic engine 126 generates the SELECT, FROM, and WHERE clauses of the pseudo SQL using the following set of heuristic rules:

1) If the variable is mapped to only one candidate field, then the field is placed in the SELECT clause and its corresponding table is placed in the FROM clause.

2) If the variable maps to more than one candidate field, then the fields to which it binds are set equal in the WHERE clause.

3) If the variable is a constant, then the candidate field to which the variable maps is set equal to the value of the constant in the WHERE clause.

FIG. 14 is a diagram illustrating the pseudo SQL generated when the heuristics of the present invention are applied to the query example. Referring to both FIGS. 12 and 13, both of the variables "$y" and "$z" map to only candidate field in the binding list, CL.SSN and XP.ADD, respectively. Therefore, only those fields are used in the SELECT clause. Since the variables "$x" maps to more than one field, the fields to which it maps, [CL.PERSON] and [XP.PERSON], are set equal in the WHERE clause. Since the variable "Fred" is a constant, the field to which it maps is set equal to the value of the constant, "Fred".

In the query example, the WHERE clause contains two implicit fields pertaining to the concept of a "person". Because the concept "person" is a concept that is only implicitly referenced in the tables, the knowledge base 110 must be searched for explicit fields that can identify a specific instance of a "person" to satisfy the query.

Referring again to FIG. 11, after the pseudo SQL is generated, the heuristic engine 126 expands the implicit fields that are present in the pseudo SQL into explicit fields in order to generate a SQL query in step 208. This is accomplished by searching both the BDK 128 and the MES 130 in the knowledge base 110.

The MES 130 is searched for literals that have implicit fields which match the implicit fields in the pseudo SQL. The result of the search is a set of possible explicit fields that may be used to replace the implicit fields in the pseudo SQL.

Referring again to the pseudo SQL of FIG. 14, the WHERE clause contains implicit fields, [CL.PERSON] and [XP.PERSON], which must be expanded into explicit fields. The MES of FIG. 10 is therefore searched for literals that contain implicit fields matching the implicit field [CL.PERSON] and [XP.PERSON] from the WHERE clause. The first three literals in the example MES contain implicit fields matching [CL.PERSON]. As a result, the explicit fields CL.SSN, CL.CID, and CL.BIRTH_DATE could be used to replace the implicit field [CL.PERSON]. The last four literals in the example MES contain implicit fields matching [XP.PERSON]. Therefore, the explicit fields XP.ADD, XP.CUST_ID, XP.FIRST_NAME, and XP.DOB could be used to replace [XP.PERSON].

After generating a set of possible explicit fields that may be used to replace the implicit fields in the pseudo SQL the set must be reduced to a set of only legal replacement explicit fields as defined in the BDK 128. This is done by matching the implicit fields in the pseudo SQL with the predicates in the BDK 128, and by performing an intersection between the set of possible explicit fields and each list of attributes corresponding to the matching predicate in the BDK 128.

Referring again to the pseudo SQL example of FIG. 14, the BDK is searched for a literal having a predicate that matches the string "PERSON" from the implicit fields [CL.PERSON] and [XP.PERSON]. An example literal from the BDK having the matching predicate "PERSON" is shown in FIG. 9. The set of possible explicit fields that may be used to replace the implicit fields in the pseudo SQL is then reduced to a set of legal replacement explicit fields. By performing an intersection between the set of available explicit fields and each list of attributes corresponding to the matching predicate in the BDK 128, each implicit field in the pseudo SQL is replaced with the explicit fields defined by the attributes in one of the attribute lists. Any explicit fields that match the attributes in an attribute list must also be shared between the tables in order to co-identify a specific object in the two tables.

Determining if all of the attributes in a particular attribute list is shared between the available tables is performed by the following process: For the relevant literal in the BDK, an attribute list is found where each attribute therein matches predicates in the literals in the MES for each implicit field to be replaced.

Referring again to the example in FIG. 9, each attribute list in the example literal is shown searched until one is found in which all its attributes match the predicates in the MES of FIG. 10. In the first attribute list in the BDK, none of the attributes match predicates in the literals in the MES that correspond to both implicit fields [CL.PERSON] and [XP. PERSON]. In the second attribute list in FIG. 9, the attribute DATE_OF BIRTH matches the predicates for two of the literals containing both implicit fields [CL.PERSON] and [XP.PERSON], but the other attributes in that attribute list do not.

Only the third attribute list in the example BDK literal satisfies the criteria. The attribute UNIQUE_STRING_ID matches the predicates for literals containing both implicit fields [CL.PERSON] and [XP.PERSON]. In this example, the explicit fields CL.CID and XP.CUST_ID are chosen to replace the implicit fields [CL.PERSON] and [XP PERSON] in the pseudo SQL because the values contained in the fields CL.CID and XP.CUST_ID can be used to co-identify a person from the CL table and the XP table.

The process of attempting to replace implicit fields in the pseudo SQL with explicit fields may result in some implicit fields in the pseudo SQL being replaced with implicit fields from the MES literals, rather than with explicit fields. Assume for example that in order to respond to a user query, a specific "doctor" needs to be identified from the tables, and that the pseudo SQL resulting from the query therefore includes the implicit field [DOCTOR]. Assume further that the knowledge base 110 includes a literal that defines the concept of DOCTOR as being related to, or a subset of, the concept of PERSON. Therefore, the heuristic engine 126 uses the BDK literal for PERSON to replace the implicit reference to [DOCTOR] in the pseudo SQL with the explicit fields defined in the attribute lists for PERSON. To identify the doctor using the attributes provided for PERSON, the heuristic engine 126 will search for explicit fields in the relevant table pertaining to the attributes "FIRST_NAME", "LAST_NAME" and "PHONE_NUMBER". If those explicit fields are not found then the heuristic engine 126 will search for explicit fields pertaining to "DATE_OF_BIRTH", "ADDRESS", and "LAST_NAME" and so on. When a set of legal replacement explicit fields is found, the implicit field [DOCTOR] in the pseudo SQL is replaced with that set of explicit fields.

In situations where the heuristic engine 126 needs to co-identify two objects by joining two different tables, the two tables to be joined may not share the correct set of explicit fields. For example, one table may include the explicit field "SSN" to identify a person, while the other table includes the explicit fields "FIRST_NAME", "LAST_NAME" and "PHONE_NUMBER" to identify a person. The two tables cannot readily be joined to co-identify a specific person because given values for these attributes, there is no way to determine if the attribute values co-identify the same person in the different tables.

According to the present invention, however, the heuristic engine 126 will attempt to co-identify the person by searching for a third table that includes explicit fields pertaining to all of the attributes found in the first two tables. Once such a third table is found, the heuristic engine 126 will create SQL that performs a three-way join between all three tables. If the third table is not found, then a fourth table is searched for that includes an explicit field pertaining to the attribute "SSN" from the first table, and explicit fields pertaining to the attributes "DATE_OF_BIRTH", "ADDRESS", and "LAST_NAME" as set forth in the second attribute list for PERSON. The above process continues until a set of tables is found that share a set of explicit fields necessary to co-identify the object defined in the implicit field in the pseudo SQL.

FIG. 15 is a block diagram illustrating the final SQL query that is generated from the pseudo SQL once the implicit fields are replaced by explicit fields. The resulting SQL query will result in answers to the user's query "Find all social security numbers and corresponding addresses for all bank customers having a first name of 'Fred'".

Referring again to FIG. 11, after the SQL query is generated, the heuristic engine 126 passes the SQL query to the DBMS controlling the heterogeneous database 106 the in step 210. In some database environments, it is possible that column fields representing the same concepts (e.g. customer IDs) in two different tables may not use the same field values to represent the same instances of those concepts, particularly when the databases are designed by completely separate entities. In some cases, two columns in different tables may both support character strings to represent the same concept or objects, but the values used to fill those character strings may be different due to the use of synonyms and abbreviations. In other cases, one column may represent the concept using character strings, while the other column represents the concept using numeric codes. For example, the CL table may represent one customer ID as the string "Forty-one", while the XP table may represent the same customer ID as the code "41". If an attempt is made to join two such tables, the join condition will fail because the field values used to represent instances of the same concept in the columns do not equal one another. That is, although the field value "Forty-one" in CL.CID has the same meaning as the field value "41" in XP.CUST_ID, the actual field values "Forty-one" and "41" do not equate and the join will fail.

In order to perform joins across two or more fields representing similar concepts but that use different field values, the present invention may be used in conjunction with the invention disclosed U.S. patent application Ser. No. 08/925,786, entitled "A Method And System For Performing Conceptual Joins Across Fields Of A Database" assigned to the assignee of the present application, and herein incorporated by reference. Therein, table fields are joined based on whether the field values represent the same concept, rather than whether the field values themselves are identical.

Referring again to FIG. 11, after executing the SQL query, the heuristic engine 126 receives the relevant tuples (row and column values) back from the heterogeneous database 106 in step 212. Thereafter, the tuples are sent back to the user (after removing duplicates, etc., where possible) in step 214.

A method and system for heuristically co-identifying objects across heterogenous information sources has been disclosed. In a database environment, the present invention automatically generates the SQL necessary to perform joins across tables in a heterogeneous database, thereby enabling a user to access the database without knowledge of the database schemes and without the need for a MIS person. Software written according to the present invention is to be stored in some form of computer-readable medium, such as memory or CD-ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-implemented method for generating a database query request, comprising the steps of:
   receiving a query requesting information;
   providing a list of fields to be queried, the list of fields including a first field from a first table and a second field from a second table;
   generating a database query request using the list of fields, said database query request including a join between the first and second fields; and
   wherein said query includes a conjunction of literals;
   wherein each literal includes a predefined term that defines a relationship between fields in a table and a concept.

2. The method of claim 1, further comprising the steps of:
   mapping each of the literals to all matching expressions, wherein the mapping indicates that the first and second fields have the same meaning.

3. The method of claim 2, further comprising the step of:
   providing each literal in the query with any of a predicate that matches one of the predicates in the plurality of expressions and at least one variable.

4. The method of claim 2, further comprising the step of:
   generating a binding list of variables from the literals that map to fields in the first and second tables, each entry in the binding list identifying what field in the first and second table may be used to retrieve values for the corresponding variables.

5. The method of claim 4, further comprising the step of:
   using each entry in the binding list as a constraint to be satisfied in a WHERE clause.

6. The method of claim 4 wherein the step of generating the database query request is performed according to the steps of:
   if the variable is mapped to only one field in the binding list, then the field is placed in a SELECT clause and its corresponding table is placed in a FROM clause;
   if a variable maps to more than one field, then the fields to which it binds are set equal in a WHERE clause; and
   if the variable is a constant, then the field to which the variable maps is set equal to the value of the constant in a WHERE clause.

7. A heuristic engine for determining which of a plurality tables to join to retrieve information requested, said heuristic engine comprising:
   means for mapping a formatted expression to a matching expression in a knowledge base;
   means for determining from matching expression which tables have shared column fields;
   means for generating a standard database query statement to join the shared column fields; and
   a translator for receiving requests for information, and for translating each of the requests into a formatted expression that matches at least one of the expressions in the knowledge base;
   wherein said knowledge base comprises background domain knowledge that contains information regarding concepts that are applicable to all of the plurality of tables, and expressions that are specific to the columns of each one of the plurality of tables; and wherein said knowledge base is a network-based heterogeneous database in which requests for information originate from a user that accesses the heuristic system through a network browser and a network server.

8. A computer-implemented method for automatically generating a database query request for performing a join across tables in a heterogeneous database, each of the tables including a plurality column fields, the method comprising the steps of:

providing a knowledge base that defines relationships between column fields in the database;

receiving a database query;

mapping each query to the knowledge base;

generating the database query request, the database query request requiring at least one join between two of the fields;

executing the database query request and receiving results from the heterogeneous database;

providing a list of potential fields that comprise implicit fields and a first set of explicit fields that correspond to column fields from which to retrieve values for each variable in the query;

expanding any implicit fields present in the list of potential fields into a second set of explicit fields;

providing a list of literals that define relationships between column fields in the databases wherein a plurality of the literals contain implicit fields representing concepts that are implicitly referenced in the tables; and providing each one of said literals with a predicate, an implicit field and an explicit field, such that the predicate represents a particular concept that is attributable to the concept represented by the corresponding implicit field, and the explicit field indicates where values for the concept represented by the predicate are stored.

9. The method of claim 8, further comprising the step of:

providing each query literal with a query predicate.

10. The method of claim 9, further comprising the steps of:

comparing each query predicate to the predicates in the literals in the knowledge base; and generating a binding list of literals in the knowledge base whose predicates match query predicates.

11. The method of claim 10, further comprising the steps of:

searching the knowledge base for literals that have implicit fields which match the implicit fields in the binding list; and replacing the implicit fields with the corresponding explicit fields found in the matching literals.

12. A computer-implemented method for generating a database query request, comprising the steps of:

receiving a query requesting information;

providing a list of fields to be queried, the list of fields including a first field from a first table and a second field from a second table;

generating a database query request using the list of fields, said database query request including a join between the first and second fields; and providing a plurality of expressions that communicate the concepts of each of the fields in the first and second plurality of fields.

13. The method of claim 12, further comprising the step of:

providing each one of the plurality of expressions with a predicate and at least one argument, wherein the predicate specifies relationships between the plurality of fields in the plurality of database tables.

14. The method of claim 13, further comprising the step of:

providing the at least one argument with any of a combination of explicit fields and implicit fields and a list of attributes that identify the predicate.

* * * * *